United States Patent
Jarvis et al.

(10) Patent No.: US 10,988,703 B2
(45) Date of Patent: Apr. 27, 2021

(54) METAL WORKING FLUID

(71) Applicant: Italmatch SC, LLC, Bedford Park, IL (US)

(72) Inventors: Anthony Jarvis, Wirral (GB); Carl Williams, Stoke (GB); Richard Galsworthy, Warrington (GB); Matthew Ross, Manchester (GB)

(73) Assignee: Italmatch Chemicals SC LLC, Bedford Park, IL (US)

( * ) Notice: Subject to any disclaimer, the term of this patent is extended or adjusted under 35 U.S.C. 154(b) by 0 days.

(21) Appl. No.: 16/512,578

(22) Filed: Jul. 16, 2019

(65) Prior Publication Data

US 2021/0017465 A1    Jan. 21, 2021

(51) Int. Cl.

| | |
|---|---|
| *C10M 133/06* | (2006.01) |
| *C10M 133/12* | (2006.01) |
| *C10M 133/16* | (2006.01) |
| *C10M 145/22* | (2006.01) |
| *C10M 133/42* | (2006.01) |
| *C10M 129/16* | (2006.01) |
| *C10M 173/02* | (2006.01) |
| *A01N 43/84* | (2006.01) |
| *A01N 43/76* | (2006.01) |
| *A01N 43/88* | (2006.01) |
| *A01N 43/80* | (2006.01) |
| *A01N 31/02* | (2006.01) |
| *C10M 133/50* | (2006.01) |
| *C10N 30/16* | (2006.01) |
| *C10N 30/00* | (2006.01) |
| *C10N 40/22* | (2006.01) |

(52) U.S. Cl.
CPC ............ *C10M 145/22* (2013.01); *A01N 31/02* (2013.01); *A01N 43/76* (2013.01); *A01N 43/80* (2013.01); *A01N 43/84* (2013.01); *A01N 43/88* (2013.01); *C10M 129/16* (2013.01); *C10M 133/42* (2013.01); *C10M 133/50* (2013.01); *C10M 173/02* (2013.01); *C10M 2201/02* (2013.01); *C10M 2207/04* (2013.01); *C10M 2209/102* (2013.01); *C10M 2215/222* (2013.01); *C10M 2215/226* (2013.01); *C10M 2219/106* (2013.01); *C10N 2030/16* (2013.01); *C10N 2030/24* (2020.05); *C10N 2040/22* (2013.01)

(58) Field of Classification Search
CPC ............ C10M 133/06; C10M 2215/04; C10M 133/12; C10M 2215/06; C10M 133/16; C10M 2215/08; C10N 2040/20
See application file for complete search history.

(56) References Cited

U.S. PATENT DOCUMENTS

| | | | | |
|---|---|---|---|---|
| 4,239,635 | A * | 12/1980 | Rieder | C10M 135/26 508/508 |
| 6,255,258 | B1 * | 7/2001 | Clark | C10M 133/52 508/232 |
| 10,479,953 | B2 * | 11/2019 | Yeung | C10M 145/22 |
| 2003/0162671 | A1 * | 8/2003 | Kalota | C10M 129/72 508/154 |
| 2004/0152605 | A1 * | 8/2004 | Cutcher | C10M 159/12 508/240 |
| 2010/0264359 | A1 | 10/2010 | Straetmans et al. | |
| 2017/0073609 | A1 * | 3/2017 | Chen | C10M 135/18 |
| 2017/0101606 | A1 * | 4/2017 | Klug | C10M 173/02 |
| 2018/0291306 | A1 * | 10/2018 | Kirsch | C10M 133/06 |

FOREIGN PATENT DOCUMENTS

| | | |
|---|---|---|
| JP | H05279688 A | 10/1993 |
| WO | WO-2012/039419 A1 | 3/2012 |
| WO | WO-2017/112113 A1 | 6/2017 |
| WO | WO-2017/112362 A1 | 6/2017 |
| WO | WO-2017/117346 A1 | 7/2017 |

OTHER PUBLICATIONS

International Search Report for PCT/US2020/041750 dated Nov. 6, 2020 (3 pages).

* cited by examiner

*Primary Examiner* — Ellen M McAvoy
(74) *Attorney, Agent, or Firm* — Harness, Dickey & Pierce, P.L.C.

(57) ABSTRACT

A metal working fluid having increased resistance to bacterial growth. The metal working fluid includes a cross-linked polymeric ester emulsifier; and an amine represented by the formula $(H_2N)_a\text{-Q-}(NH_2)_b$, where a and b are each integers, and Q is at least one carbon atom. Q may also be represented by X—Y—Z, where $a+b \geq 2$; X is a cyclic ring system including 3 to 24 carbon atoms; and Y and Z are groups that include at least one carbon atom directly attached to the cyclic ring system. The metal working fluid may also include a biocide, and may also include an amide that is formed by reacting the amine with a carboxylic acid.

21 Claims, No Drawings

METAL WORKING FLUID

FIELD

The present disclosure relates to a metal working fluid.

BACKGROUND

This section provides background information related to the present disclosure which is not necessarily prior art.

A metal working fluid (MWF) is an oil or other liquid that is used to cool and/or lubricate metal work pieces when the metal work pieces are being machined, ground, milled, and the like. In this regard, metal working fluids are configured to reduce the heat and friction between the cutting tool and the metal work piece. In addition, the use of a metal working fluid also helps to improve the quality of the work piece by continuously removing the fines, chips, and swarfs (small pieces of metal removed from a work piece by a cutting tool) from the tool being used and the surface of the work piece.

While there are many different components and additives in metal working fluids, there are generally four basic classes of metal working fluids. A "straight oil" (also called a "cutting" or "neat" oil) is a type of metal working fluid that is comprised of mineral (e.g., petroleum), animal, marine, vegetable, or synthetic oils. Straight oils are not diluted with water, but other additives may be present. A "soluble oil" (also called an "emulsifiable" oil) is a type of metal working fluid that contains 30 to 85 percent of a refined petroleum oil, as well as emulsifier(s) to disperse the oil in water. A "semi-synthetic fluid" is a type of metal working fluid that contains 5 to 30 percent of a refined petroleum oil, 30 to 50 percent water, and a number of additives. Lastly, a "synthetic fluid" is a type of metal working fluid that does not contain a petroleum oil. Instead, the synthetic fluid uses detergent-like components and other additives to assisting in "wetting" the work piece.

Each of the above-noted metal working fluids may contain additives such as Sulphur-containing, phosphorus-containing, or chlorinated compounds; corrosion inhibitors (e.g., calcium sulfonate, sodium sulfonates, fatty acid soaps, amines, boric acid); extreme pressure additives (e.g., sulfurized fatty materials, chlorinated paraffins, phosphorus derivatives); anti-mist agents (e.g., polyisobutylene polymer); emulsifiers (e.g., triethanolamine, sodium petroleum sulphonates, salts of fatty acids, and non-ionic surfactants); biocides (e.g., triazine compounds, oxazolidine compounds); stabilizers; dispersants; de-foaming agents; colorants; dyes; odorants; fragrances; and other additives known to one skilled in the art.

Semi-synthetic metal working fluids are regarded as having the best all-round properties, as this type of metal working fluid simultaneously provides good cooling, lubricity, and corrosion protection. Straight or neat oils typically have better lubricity, but worse cooling; and fully synthetic fluids may have better cooling, but often have worse lubricity and corrosion protection.

In use, metal working fluids (especially those including water) can become susceptible to bacterial contamination. The bacteria can degrade the emulsions and change the properties of the metal working fluid. In this regard, the bacteria can cause the emulsion to degrade to an extent that the oil drops out of the emulsion and sits on the fluid surface, can cause a pH of the metal working fluid to drop (i.e., become acidic) which can lead to increased corrosion, can reduce lubricity of the metal working fluid which adversely affects tool life, and can potentially cause skin and respiratory conditions for anyone exposed to the metal working fluid having the increased bacterial content.

While biocides can be added to reduce the amount of microbial growth and prolong the useful life of the metal working fluid, the biocide products themselves may have hazardous properties. As a result, the number of biocides that are available for use has been reduced, especially in Europe. In addition, biocides may degrade in time either by hydrolysis or bacterial attack, which will eventually decrease the efficacy of the metal working fluid. Once the efficacy of the metal working fluid has been reduced, or the amount of bacteria in the metal working fluid is too great, it must be removed from the machine tool, which is then cleaned and replenished with fresh metal working fluid. This can take several hours of machine tool downtime, which will adversely affect productivity. As a result, a need has been identified for a metal working fluid that can resist bacteria for longer periods of time to increase productivity of the machine tools that use the metal working fluid, as well as provide a safer environment for users of the machine tools.

SUMMARY

This section provides a general summary of the disclosure, and is not a comprehensive disclosure of its full scope or all of its features.

According to a first embodiment, the present disclosure provides a metal working fluid including a cross-linked polymeric ester emulsifier; and an amine represented by the following formula (1): $(H_2N)_a$-Q-$(NH_2)_b$ (1), where a and b are each integers, and Q is any group including at least one carbon atom.

In the metal working fluid according to the first embodiment, Q may be represented by Y—X—Z, where X is a cyclic ring system including 3 to 24 carbon atoms, and Y and Z are groups that include at least one carbon atom directly attached to the cyclic ring system.

In the metal working fluid according to the first embodiment, X may be a cyclic ring system including 4 to 8 carbon atoms.

Alternatively, X may be a cyclic ring system including 6 carbon atoms.

In the metal working fluid according to the first embodiment, the cyclic ring system may be an aromatic ring or an aliphatic ring.

In the metal working fluid according to the first embodiment, the Y and Z groups may include alkylene chains (—$CH_2$)$_n$ where n is an integer between 1 and 24.

In the metal working fluid according to the first embodiment, the primary amine groups may be located at a terminal end of the alkylene chains.

In the metal working fluid according to the first embodiment, the metal working fluid may further include a biocide, wherein the biocide is selected from the group consisting of N,N'-methylenebismorpholine (MBM); 3,3'-methylene bis [5-methyloxazolidine] (MBO); α,α',α''-trimethyl-1,3,5-triazine-1,3,5(2H,4H,6H)-triethanol (HPT); hexahydrotriazine (HHT); (ethylenedioxy)dimethanol (EDDM); benzisothiazolinone (BIT); methylisothiazolinone (MIT, MI); chloromethylisothiazolinone (CMIT, CMI, MCI); octyisothiazoinone (OIT, OI); dichorooctyisothiazolinone (DCOIT, DCOI); and butylbenzisothiazolinone (BBIT).

In the metal working fluid according to the first embodiment, the amine does not include secondary or tertiary amine groups.

In the metal working fluid according to the first embodiment, the metal working fluid may further include an amide, wherein the amide may be formed through a reaction between the amine having the formula (1) with a carboxylic acid.

According to a second embodiment of the present disclosure, there is provided a metal working fluid including a cross-linked polymeric ester emulsifier; and an amide that is formed through reaction of an amine with a carboxylic acid. The amine may be represented by the following formula (1): $(H_2N)_a$-Q-$(NH_2)_b$ (1), where a and b are each integers, and Q is any group including at least one carbon atom. The carboxylic acid may be a monocarboxyic acid, a dicarboxyic acid, or a tri-carboxylic acid.

In the metal working fluid according to the second embodiment, the monocarboxyic acid may have a formula of R—COOH, where R is a saturated, linear, or branched hydrocarbon chain represented by $C_nH_{2n+1}$, where n is an integer in the range of 1 to 22.

In the metal working fluid according to the second embodiment, the dicarboxylic acid may have a formula of R—$(COOH)_2$, where R is a saturated, linear, or branched hydrocarbon chain represented by $C_nH_{2n}$, where n is an integer in the range of 1 to 22.

In the metal working fluid according to the second embodiment, the tricarboxylic acid may be selected from the group consisting of citric acid; isocitric acid; aconitic acid; propane-1,2,3-tricarboxylic acid; trimesic acid; trimellitic acid; and 2,4,6-tri-(6-aminocaproic acid)-1,3,5-triazine.

In the metal working fluid according to the second embodiment, the metal working fluid may further include a biocide, wherein the biocide is selected from the group consisting of N,N'-methylenebismorpholine (MBM); 3,3'-methylene bis [5-methyloxazolidine] (MBO); α,α',α"-trimethyl-1,3,5-triazine-1,3,5(2H,4H,6H)-triethanol (HPT); hexahydrotriazine (HHT); (ethylenedioxy)dimethanol (EDDM); benzisothiazolinone (BIT); methylisothiazoinone (MIT, MI); choromethyisothiazolinone (CMIT, CMI, MCI); octylisothiazoinone (OIT, OI); dichorooctylisothiazolinone (DCOIT, DCOI); and butylbenzisothiazolinone (BBIT).

In the metal working fluid according to the second embodiment, Q may be represented by X—Y—Z, where X may be a cyclic ring system including 4 to 8 carbon atoms, or X may be a cyclic ring system including 6 carbon atoms, and Y and Z may be groups that include at least one carbon atom directly attached to the cyclic ring system.

In the metal working fluid according to the second embodiment, the cyclic ring system may be an aromatic ring or an aliphatic ring.

In the metal working fluid according to the second embodiment, the Y and Z groups may include alkylene chains (—$CH_2$)$_n$ where n is an integer between 1 and 24, and the primary amine groups are located at a terminal end of the alkylene chains.

Lastly, in the metal working fluid according to the second embodiment, the metal working fluid may include the amine having the formula (1).

Further areas of applicability will become apparent from the description provided herein. The description and specific examples in this summary are intended for purposes of illustration only and are not intended to limit the scope of the present disclosure.

DETAILED DESCRIPTION

Example embodiments will now be described more fully with reference to the accompanying drawings.

The present disclosure provides a metal working fluid that sufficiently resists contamination by bacteria during use thereof. The metal working fluid according to a first embodiment of the present disclosure is a semi-synthetic type of metal working fluid that includes an oil, water, and various additives and emulsifiers. To increase resistance to bacterial growth and lengthen the useful life of the metal working fluid, one of the additives of the metal working fluid is an amine that includes at least two primary amine groups (—$NH_2$). The amines that include at least two primary amine groups according to the present disclosure are those that include a cyclic ring system and those that do not include a cyclic ring system.

A metal working fluid according to a second embodiment of the present disclosure is a semi-synthetic type of metal working fluid that includes an oil, water, and various additives and emulsifiers. In contrast to using an amine to increase resistance to bacterial growth and lengthen the useful life of the metal working fluid, however, one of the additives of the metal working fluid is an amide that is formed from one of the above-noted amines. It should be understood, however, that the amines and amides of the present disclosure may also be used in combination in a metal working fluid without departing from the scope of the present disclosure.

With respect to the first embodiment, example amines that include at least two primary amine groups that include a cyclic ring system include 1,2-cyclohexanediamine; 1,4-cyclohexanediamine; and 4,4'-methylene-bis-cyclohexylamine. Example amines that include at least two primary amine groups, that do not include a cyclic ring system, include 2-methylpentane-1,5-diamine; 1,6-diaminohexane; and 1,3-diaminopentane. 2-Methylpentane-1,5-diamine is available commercially under the tradename Dytek® A, manufactured by Invista™, and 1,3-diaminopentane is commercially available under the tradename Dytek® EP, manufactured by Invista™.

The above amines can be described using the following formula (1): $(H_2N)_a$-Q-$(NH_2)_b$ (1), where a and b are integers, and Q is any group comprising at least one carbon atom.

Preferably, the amines according to the present disclosure include at least two primary amine groups and a cyclic ring system, and at least one of the primary amine groups is located in a side chain off the cyclic ring system. Amines comprising only secondary or tertiary amine groups do not form part of the present disclosure.

More preferably, the amines according to the present disclosure include at least two primary amine groups and a cyclic ring system, wherein each of the two primary amine groups are located in side chains off the cyclic ring system. Amines of this type are represented by the following formula (2):

$(H_2N)_a$—Y—X—Z—$(NH_2)_b$       (2), where a and b are each integers; a+b≥2; X is a cyclic ring system including 3 to 24 carbon atoms, more preferably 4 to 8 carbon atoms, and even more preferably 6 carbon atoms; and Y and Z are groups that include at least one carbon atom directly attached to the cyclic ring system.

The cyclic ring system (X) may be an aromatic ring or an aliphatic ring. For example, if X is an aromatic ring containing six carbon atoms, X may be a benzene ring. Similarly, if X is an aliphatic ring including six carbon atoms, X may be a cyclohexane ring. For ring systems that exhibit isomerism, the present disclosure contemplates the use of either cis or trans configurations, or any combination thereof.

Example (Y) and (Z) groups include alkylene chains (—$CH_2$)$_n$ where n is an integer between 1 and 24, wherein the primary amine groups can be located at any position of the chain. Although the primary amine groups can be located at any position of the chain, it is preferable that the primary amine group be located at a terminal end of the chain. The cyclic ring (X) and side chains (Y and Z) may also comprise other functional groups known in organic chemistry, such as halogen, oxygen, phosphorus, nitrogen, and Sulphur-containing groups.

An example of a particularly preferred amine that comprises two primary amine groups that are both located in side chains attached to a cyclohexane ring system is 1,3-bis (aminomethyl)cyclohexane, which can be the cis or trans configuration, or any combination thereof.

Although not required, it is preferred that the amines of the present disclosure that comprise at least two primary amine groups are those that exhibit excellent pH buffering properties in a metal working fluid formulation. It is also preferable that the amine assist in inhibiting ferrous corrosion and reducing aluminum staining.

The metal working fluids according to the present disclosure may include various additives. For example, the metal working fluid according to the present disclosure may include at least one emulsifier; at least one lubricant; at least one extreme pressure additive that may be a compound that is halogen-, phosphorus-, Sulphur-, or molybdenum-based; at least one corrosion inhibitor including compounds that may be boron-based or a boron-free amine carboxylate; at least one metal passivator; at least one anti-foam agent; at least one fungicide or biocide; at least one anti-misting agent; at least one chelating agent; at least one dye; and the like. It should be understood that the above-noted compounds for the extreme pressure additive and the corrosion inhibitor are examples only, and other materials known to one skilled in the art may be used without limitation.

Example emulsifiers that may be used in the metal working fluid of the present disclosure include cross-linked polymeric esters, examples of which are disclosed in WO 2017/117346, which is incorporated by reference in its entirety herein. The emulsifiers disclosed therein are commercially available from Italmatch Chemicals GB Ltd. as the Polartech® EA 7xx series of products, which includes Polartech® EA 700/705/710/711/715.

Example biocides that may be used in the metal working fluids according to the present disclosure include formaldehyde releasers such as, for example, N,N'-methylenebismorpholine (MBM); 3,3'-methylene bis [5-methyloxazolidine] (MBO); α,α',α"-trimethyl-1,3,5-triazine-1,3,5(2H,4H,6H)-triethanol (HPT); hexahydrotriazine (HHT); and (ethylenedioxy)dimethanol (EDDM). Other biocides include substances that do not release formaldehyde including, for example, isothiazolinone compounds such as benzisothiazolinone (BIT); methylisothiazolinone (MIT, MI); chloromethylisothiazolinone (CMIT, CMI, MCI); octylisothiazolinone (OIT, OI); dichlorooctylisothiazolinone (DCOIT, DCOI); and butylbenzisothiazolinone (BBIT).

Next, an example metal working fluid (Example 1) according to the first embodiment of the present disclosure was manufactured. In addition, a pair of comparative examples (Comparative Examples 1 and 2) were manufactured. The metal working fluids according to Examiner 1 and Comparative Examples 1 and 2 each have the below formula shown in Table 1.

TABLE 1

| Component | wt % |
| --- | --- |
| Monoethanolamine-borate | 14 |
| Test amine(s) | See below |
| Carboxylic acids | 3.5 |
| Test Emulsifier | See below |
| Co-emulsifier | 3.5 |
| Water | 22 |
| Paraffinic mineral oil | 30 |
| Ester | 2 |
| Benzisothiazolinone (BIT) biocide | 2 |
| Fungicide | 1 |
| Solvents | Balance |
| Total | 100 |

The "test amine" used in Example 1 was 1,3-bis(aminomethyl)cyclohexane in an amount equal to about 3 wt %. In addition, the "test emulsifier" was Polartech® EA 700 (i.e., a cross-linked polymeric ester) in an amount equal to about 6%.

The "test amine" used in Comparative Example 1 included monoethanolamine in an amount equal to about 1 wt %, and triethanolamine in an amount equal to about 6.8 wt %. In addition, the "test emulsifier" was Polartech® EA 700 in an amount equal to about 6%.

The "test amine" used in Comparative Example 2 included 1,3-bis(aminomethyl)cyclohexane in an amount equal to about 5 wt %. In addition, the "test emulsifier" was PET Sulphonate 650 in an amount equal to about 10 wt %.

Example 1 and Comparative Examples 1 and 2 were each formulated to the same approximate level of alkalinity.

Next, Example 1 and Comparative Examples 1 and 2 were subjected to fluid life testing to determine each formulation's ability to withstand bacterial degradation and prolong the life of a metal working fluid. In this regard, the three semi-synthetic metal working fluid concentrates prepared in Example 1, Comparative Example 1, and Comparative Example 2 were converted into aqueous oil-in-water emulsions for fluid life testing by mixing each of the concentrates with tap water such that the resultant metal working fluids each included about 5% of the respective concentrate and 95% of the tap water. About five liters of each of the metal working fluids were prepared, and each metal working fluid was placed into a 20 L Perspex bath. Each bath contained a recirculation pump and a heater so that the metal working fluids could be continuously recirculated at a constant 30±2° C. The bath also contained a nylon mesh filter bag into which cast iron chips (100 g) were placed. The baths were each arranged so that the metal working fluids were constantly recirculated through the cast iron chips.

Once the baths were set up, a dose (50 ml) of spoiled emulsion (i.e., an emulsion containing bacteria) was added to each of the baths. In this regard, adding spoiled emulsion containing >$10^7$ CFU/ml bacteria to a metal working fluid is known to encourage bacterial degradation. The metal working fluids were then left recirculating continuously at 30° C., 24 hours a day/7 days a week. After one week had passed, each of the metal working fluids were then tested for bacterial contamination using agar dip slides. Specifically, after the dip slide had been treated with each respective metal working fluid and placed into the incubator, another dose (50 ml) of spoiled emulsion was added to each of the remaining amounts of metal working fluids and left to recirculate in the respective bath for another week at 30° C., after which time the dip slide testing and dosing procedure was repeated. This process was continuously repeated until a bacterial contamination of $10^7$ CFU/ml was recorded in the metal working fluids. At this point the metal working fluid was deemed to have reached the end of its useful life, and the test was stopped.

Table 2 below shows the results of the tests conducted on the metal working fluids of Example 1, Comparative Example 1, and Comparative Example 2. As can be seen in Table 2, the metal working fluid of Example 1 according to the present disclosure yielded a superior resistance to bacteria growth. Indeed, the amount of time required to yield $10^7$ bacterial per CFU/ml was over double the amount of time required for each of Comparative Example 1 and Comparative Example 2. As a result, the combination of the amine 1,3-bis(aminomethyl)cyclohexane and emulsifier Polartech® EA 700 has provided an unexpectedly long fluid life.

TABLE 2

| Example | Weeks to $10^7$ CFU/ml bacteria |
| --- | --- |
| Comparative Example 1 | 9 |
| Comparative Example 2 | 9 |
| Example 1 | 19 |

The amines of the present disclosure were also tested to determine whether each sample was sufficient in inhibiting corrosion. This was assessed using an IP 287 test method for determination of rust prevention characteristics of water mix metal working fluids, as follows. Solutions of the test amines in 200 ppm water were applied to PERA cast iron test chips (2 g) on a piece of Whatman No. 6 filter paper 90 mm diameter. The fluid remained in contact with the cast iron chips on the filter paper for 2 hours, after which time the fluid covered chips were removed and the staining of the paper assessed visually. The result is the minimum concentration needed to produce a completely stain free piece of filter paper. The amines according to the present disclosure that were tested included 1,3-bis(aminomethyl)cyclohexane and 1,2-diaminopentane. Comparative amines included monoethanolamine and 3-amino-4-octanol. The minimum concentration required for the amines according to the present disclosure required a concentration of 0.5%. Meanwhile, monoethanolamine required a concentration of 0.5%, and 3-amino-4-octanol required a concentration of 1.0%. This in indicates that in addition to prolonging the service life of the metal working fluid, the amines according to the present disclosure also exhibit good ferrous corrosion inhibition properties.

Now, a second embodiment of the present disclosure will be described. According to the second embodiment of the present disclosure, the above-noted amines can also be used to create amides that are particularly useful in metal working fluids, especially water-based metalworking fluids. In this regard, metal working fluids including an amide based on the above-noted amines have been found to be surprisingly effective at inhibiting ferrous corrosion. A metal working fluid including such an amide may also preferably include a polymeric emulsifier, but it is not required. In addition, a metal working fluid including an amide according to the present disclosure may also preferably include a biocide, but it is also not required.

The amides for use in the metal working fluids according to the present disclosure are formulated by reacting the above-noted amines with a carboxylic acid, which react at high temperature via a condensation reaction with the elimination of water. Because the amides are based on the above-noted primary amines, the amides will include at least one NHCO— group. Example carboxylic acids include mono-valent compounds and polyvalent compounds such as di- and tri-carboxylic acids. The term "carboxylic acid," however, should also be understood to include carboxylic acid derivatives such as acid halides, acid anhydrides, and esters.

The carboxylic acid group or groups can be attached to a carbon atom that is part of a chain system. The chain system can be hydrocarbon or can comprise other functional groups known in organic chemistry such as those including O, N, P or S atoms. The chain system can be saturated or unsaturated, include straight chains or branched chains, and/or include ring systems that can be aliphatic, aromatic, homocyclic, or heterocyclic.

Examples of suitable monocarboxylic acids include those represented by the formula R—COOH, where R is a saturated, linear, or branched hydrocarbon chain represented by $C_nH_{2n+1}$, where n is an integer in the range of 1 to 22. Example compounds having such a formula include dodecanoic acid and stearic acid. Other examples of suitable monocarboxylic acids include tall oil fatty acids; ricinoleic acid; oleic acid; erucic acid; isononanoic acid; 3,5,5-trimethylhexanoic acid; neodecanoic acid; naphthenic acid; undecenoic acid; undecynoic acid; alkoxylated ether carboxylic acids such as alkoxylated alkyl ether carboxylic acids; amino acids; and Sulphur-containing carboxylic acids such as 6-[[(4-methylphenyl)sulphonyl]amino]hexanoic acid.

Examples of suitable di-carboxylic acids include those represented by the formula R—(COOH)$_2$, where R is a saturated, linear, or branched hydrocarbon chain represented by $C_nH_{2n}$, where n is an integer in the range of 1 to 22. Example compounds having such a formula include azelaic acid; adipic acid; sebacic acid; undecanedioic acid; and dodecanedioic acid. Other suitable examples include unsaturated chains such as maleic acid and aromatic rings such as benzenedicarboxylic acid.

Examples of suitable tri-carboxylic acids include citric acid; isocitric acid; aconitic acid; propane-1,2,3-tricarboxylic acid; trimesic acid; trimellitic acid; and 2,4,6-tri-(6-aminocaproic acid)-1,3,5-triazine, known commercially as Irgacor L190 Plus manufactured by BASF.

Reaction of the amines of the present disclosure with at least 1 carboxylic acid comprising 2 or more carboxylic acid groups yields a polyamide species according to the present disclosure.

For example, to manufacture a metal working fluid including an amide according to the present disclosure (Example 2), one mole (102 g) of 1,3-diaminopentane (Dytek EP) and 0.216 moles (156 g) 2,4,6-tri-(6-aminocaproic acid)-1,3,5-triazine (Irgacor L190 Plus (65% active), (tri-carboxylic acid=0.65 mol carboxylic acid groups)) were added to a suitable reaction vessel. The reaction mixture was then heated to 140° C. over a period of 3 hours and then held at this temperature. The elimination of water was monitored and when it appeared that no further water was being eliminated the reaction mixture temperature was raised to 190° C. over a time period of 2 hours. The reaction mixture was then held at this increased temperature until the acid value had decreased to around 20 mgKOH/g. The reaction mixture was then left stirring to cool. When the temperature had reached 80° C., 50 ml of water was added to the reaction vessel. The reaction mixture was then left stirring to cool for a further hour by which time its temperature had decreased to 50° C. The final reaction mixture amide had a pH of 11.20 (1% solution in deionized water), the total alkalinity was 33.79%, and the acid value was about 15.16 mg KOH/g.

Next, a comparative amide (Comparative Example 3) was made using 3-amino-4-octanol, which is an alkanolamine commonly used in water-based metal working fluid. The 3-amino-4-octanol was reacted with 2,4,6-tri-(6-aminocaproic acid)-1,3,5-triazine using the same stoichiometric ratios and method as Example 2.

The synthesized amides were each formulated into metal working fluid semi-synthetic concentrates according to Table 3:

TABLE 3

| Component | % |
|---|---|
| Deionized water | 30 |
| Synthesized amide | 15 |
| Naphthenic base oil | 30 |
| Alkanolamines | 2 |
| Carboxylic acids | 5 |
| Polarteche ® EA 700 | 3 |
| Ester | 3 |
| Couplers | 10 |
| Benzisothiazolinone (BIT) biocide | 2 |
| Total | 100 |

Next, Example 2 and Comparative Example 3 were subjected to fluid life testing to determine each formulation's ability to withstand bacterial degradation and prolong the life of a metal working fluid. In this regard, the two semi-synthetic metal working fluid concentrates prepared in Example 2 and Comparative Example 3 were converted into aqueous oil-in-water emulsions for fluid life testing by mixing each of the concentrates with tap water such that the resultant metal working fluids each included about 5% of the respective concentrate and 95% of the tap water. About five liters of each of the metal working fluids were prepared, and each metal working fluid was placed into a 20 L Perspex bath. Each bath contained a recirculation pump and a heater so that the metal working fluids could be continuously recirculated at a constant 30±2° C. The bath also contained a nylon mesh filter bag into which cast iron chips (100 g) were placed. The baths were each arranged so that the metal working fluids were constantly recirculated through the cast iron chips.

Once the baths were set up, a dose (50 ml) of spoiled emulsion (i.e., an emulsion containing bacteria) was added to each of the baths. In this regard, adding spoiled emulsion containing >$10^7$ CFU/ml bacteria to a metal working fluid is known to encourage bacterial degradation. The metal working fluids were then left recirculating continuously at 30° C., 24 hours a day/7 days a week. After one week had passed, each of the metal working fluids were then tested for bacterial contamination using agar dip slides. Specifically, after the dip slide had been treated with each respective metal working fluid and placed into the incubator, another dose (50 ml) of spoiled emulsion was added to each of the remaining amounts of metal working fluids and left to recirculate in the respective bath for another week at 30° C., after which time the dip slide testing and dosing procedure was repeated. This process was continuously repeated until a bacterial contamination of $10^7$ CFU/ml was recorded in the metal working fluids. At this point the metal working fluid was deemed to have reached the end of its useful life, and the test was stopped.

Table 4 below shows the results of the tests conducted on the metal working fluids of Example 2 and Comparative Example 2. As can be seen in Table 4, the metal working fluid of Example 2 according to the present disclosure yielded a superior resistance to bacteria growth. Indeed, the amount of time required to yield $10^7$ bacterial per CFU/ml was over double the amount of time required for Comparative Example 3. As a result, the inventive amide of the present disclosure provides an unexpectedly long fluid life.

Example 2 and Comparative Example 3 were also tested to determine whether each sample was sufficient in inhibiting corrosion. This was assessed using the IP 287 test method for determination of rust prevention characteristics of water mix metal working fluids, as follows. Solutions of the test amide in 200 ppm water were applied to PERA cast iron test chips (2 g) on a piece of Whatman No. 6 filter paper 90 mm diameter. The fluid remained in contact with the cast iron chips on the filter paper for 2 hours, after which time the fluid covered chips were removed and the staining of the paper assessed visually. The result is the minimum concentration needed to produce a completely stain free piece of filter paper.

TABLE 4

| Example test emulsion | Weeks to $10^7$ CFU/ml bacteria | Ferrous corrosion - % to clear* |
|---|---|---|
| Example 2 | 10 | 4.0 |
| Comparative Example 3 | 5 | 4.0 |

While the amide of Example 2 produced a similar level of ferrous corrosion resistance as the amide of Comparative Example 3, the amide of Example 2 provided a superior fluid life.

Lastly, it should be understood that the amines according to the present disclosure can also be used in a carbamate form where the above-noted amines are reacted with carbon dioxide.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A metal working fluid, comprising:
   a polymeric ester emulsifier that in and of itself is cross-linked; and
   an amine represented by the following formula (1):

$(H_2N)_a$-Q-$(NH_2)_b$     (1), where a and b are each integers, and Q is represented by Y—X—Z, where X is a cyclic ring system including 3 to 24 carbon atoms, Y and Z are groups that include at least one carbon atom directly attached to the cyclic ring system, and the amine groups are attached to the Y and Z groups, respectively.

2. The metal working fluid according to claim 1, wherein X is a cyclic ring system including 4 to 8 carbon atoms.

3. The metal working fluid according to claim 1, wherein X is a cyclic ring system including 6 carbon atoms.

4. The metal working fluid according to claim 1, wherein the cyclic ring system is an aromatic ring or an aliphatic ring.

5. The metal working fluid according to claim 1, wherein the Y and Z groups include alkylene chains ($-CH_2-$)$_n$, where n is an integer between 1 and 24.

6. The metal working fluid according to claim 5, wherein the primary amine groups are located at a terminal end of the alkylene chains.

7. The metal working fluid according to claim 1, further comprising a biocide.

8. The metal working fluid according to claim 7, wherein the biocide is selected from the group consisting of N,N'-methylenebismorpholine (MBM); 3,3'-methylene bis [5-methyloxazolidine] (MBO); α,α',α"-trimethyl-1,3,5-triazine-1,3,5(2H,4H,6H)-triethanol (HPT); hexahydrotriazine (HHT); (ethylenedioxy)dimethanol (EDDM); benzisothiazolinone (BIT); methylisothiazolinone (MIT, MI); chloromethylisothiazolinone (CMIT, CMI, MCI); octylisothiazolinone (OIT, OI); dichlorooctylisothiazolinone (DCOIT, DCOI); and butylbenzisothiazolinone (BBIT).

9. The metal working fluid according to claim 1, wherein the amine does not include secondary or tertiary amine groups.

10. The metal working fluid according to claim 1, further comprising an amide, the amide being formed through a reaction between the amine having the formula (1) with a carboxylic acid.

11. A metal working fluid, comprising an amide that is formed through reaction of an amine with a carboxylic acid,
wherein the amine is represented by the following formula (1):

$(H_2N)_a$-Q-$(NH_2)_b$     (1), where a and b are each integers, and Q is represented by Y—X—Z, where X is a cyclic ring system including 3 to 24 carbon atoms, Y and Z are groups that include at least one carbon atom directly attached to the cyclic ring system, and the amine groups are attached to the Y and Z groups, respectively; and wherein the carboxylic acid is a monocarboxylic acid, a dicarboxylic acid, or a tri-carboxylic acid.

12. The metal working fluid according to claim 11, further comprising a polymeric ester emulsifier that in and of itself is cross-linked.

13. The metal working fluid according to claim 11, wherein the monocarboxylic acid has a formula of R—COOH, where R is a saturated, linear, or branched hydrocarbon chain represented by $C_nH_{2n+1}$, where n is an integer in the range of 1 to 22.

14. The metal working fluid according to claim 11, wherein the dicarboxylic acid has a formula of R—(COOH)$_2$, where R is a saturated, linear, or branched hydrocarbon chain represented by $C_nH_{2n}$, where n is an integer in the range of 1 to 22.

15. The metal working fluid according to claim 11, wherein the tricarboxylic acid is selected from the group consisting of citric acid; isocitric acid; aconitic acid; propane-1,2,3-tricarboxylic acid; trimesic acid; trimellitic acid; and 2,4,6-tri-(6-aminocaproic acid)-1,3,5-triazine.

16. The metal working fluid according to claim 11, further comprising a biocide.

17. The metal working fluid according to claim 16, wherein the biocide is selected from the group consisting of N,N'-methylenebismorpholine (MBM); 3,3'-methylene bis [5-methyloxazolidine] (MBO); α,α',α"-trimethyl-1,3,5-triazine-1,3,5(2H,4H,6H)-triethanol (HPT); hexahydrotriazine (HHT); (ethylenedioxy)dimethanol (EDDM); benzisothiazolinone (BIT); methylisothiazolinone (MIT, MI); chloromethylisothiazolinone (CMIT, CMI, MCI); octylisothiazolinone (OIT, OI); dichlorooctylisothiazolinone (DCOIT, DCOI); and butylbenzisothiazolinone (BBIT).

18. The metal working fluid according to claim 11, wherein X is a cyclic ring system including 4 to 8 carbon atoms, or X is a cyclic ring system including 6 carbon atoms.

19. The metal working fluid according to claim 18, wherein the cyclic ring system is an aromatic ring or an aliphatic ring.

20. The metal working fluid according to claim 11, wherein the Y and Z groups include alkylene chains ($-CH_2-$)$_n$, where n is an integer between 1 and 24, and the primary amine groups are located at a terminal end of the alkylene chains.

21. The metal working fluid according to claim 11, further comprising an amine having the formula (1).

* * * * *